United States Patent
Lee et al.

(10) Patent No.: US 6,897,585 B2
(45) Date of Patent: May 24, 2005

(54) KINETIC PRESSURE BEARING MOTOR

(75) Inventors: Ho Lee, Hwasung-si (KR); Sang-Hwan Park, Suwon-si (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 20 days.

(21) Appl. No.: 10/459,304

(22) Filed: Jun. 11, 2003

(65) Prior Publication Data

US 2004/0135447 A1 Jul. 15, 2004

(30) Foreign Application Priority Data

Jan. 9, 2003 (KR) .................................. 10-2003-0001375

(51) Int. Cl.[7] .............................................. H02K 5/16
(52) U.S. Cl. ....................................................... 310/90
(58) Field of Search ................................. 310/90, 90.5

(56) References Cited

U.S. PATENT DOCUMENTS

| | | | | |
|---|---|---|---|---|
| 5,598,048 A | * | 1/1997 | Dunfield et al. | 310/90.5 |
| 5,969,448 A | * | 10/1999 | Liu et al. | 310/90 |
| 6,271,612 B1 | * | 8/2001 | Tanaka et al. | 310/90 |
| 6,339,270 B1 | * | 1/2002 | Ichiyama | 310/67 R |
| 6,343,877 B1 | * | 2/2002 | Miura et al. | 384/100 |
| 6,498,411 B2 | * | 12/2002 | Kanebako | 310/90.5 |

FOREIGN PATENT DOCUMENTS

KR  1999-20701  5/2001

* cited by examiner

Primary Examiner—Darren Schuberg
Assistant Examiner—Nguyen Hanh
(74) Attorney, Agent, or Firm—Gottlieb, Rackman & Reisman, P.C.

(57) ABSTRACT

Disclosed herein is a kinetic pressure bearing motor, which is provided with an auxiliary dynamic pressure generating means, thus allowing a motor shaft to be stably rotated at a high speed, and considerably reducing vibration, therefore enhancing the performance of the motor. The kinetic pressure bearing motor includes a support unit which is provided at an outer surface of a motor shaft, and a shaft holder which is fitted over an upper portion of the motor shaft. Further, grooves for generating dynamic pressure are formed on an outer surface of the support unit. An extension is provided at the shaft holder to support the support unit in such a way as to be in contact with the outer surface of the support unit having the grooves.

9 Claims, 8 Drawing Sheets

KINETIC PRESSURE BEARING MOTOR

BACKGROUND OF THE INVENTION

1. Field of the Invention

The present invention relates generally to a kinetic pressure bearing motor, and more particularly, to a kinetic pressure bearing motor which is provided with an auxiliary dynamic pressure generating means, thus allowing a motor shaft to be stably rotated at a high speed and reducing vibration, therefore enhancing performance of the motor and reducing the manufacturing cost of the motor.

2. Description of the Prior Art

As well known to those skilled in the art, bearings are used in constant high-speed motors, such as a scanner motor which is used in a laser printer. The bearings function to support a motor shaft to prevent it from inclining when the motor is rotated at a high speed, so that the motor shaft stands upright. The conventional bearings are typically classified into two types, that is, a sintered oil retaining bearing and a fluid dynamic bearing.

FIG. 1 is a sectional view showing a conventional motor in which a sintered oil retaining bearing is installed. Referring to FIG. 1, the conventional motor having the sintered oil retaining bearing is provided with a cylindrical bearing holder 10. The bearing holder 10 has a hollow part in which a motor shaft 2 is inserted. An annular boss 10a is provided at an outer surface of the bearing holder 10. A base plate 9 is provided at the outer surface of the bearing holder 10 in such a way as to be supported at the annular boss 10a.

Further, a stator assembly is mounted to the outer surface of the bearing holder 10, and is provided with a core 8a around which a coil 8 is wound.

The bearing holder 10 is designed such that the motor shaft 2 is rotatably inserted into the bearing holder 10. The motor shaft 2 is supported in vertical and horizontal directions by a sintered oil retaining bearing 1 which is provided in the bearing holder 10.

The sintered oil retaining bearing 1 is fabricated through a sintering process, so many inter-particle pores exist. Since oil is injected into the inter-particle pores in a vacuum state, oil is uniformly distributed in the bearing 1 at the initial rotating stage of the motor shaft 2 as well as when the motor shaft 2 is rotated or stopped.

A shaft holder 3 is fitted over an upper portion of the motor shaft 2. A polygon mirror 5 is firmly seated on an upper portion of the shaft holder 3.

A rotor casing 6 is mounted to a lower portion of the shaft holder 3. A magnet 7 is attached to an inner surface of the rotor casing 6 in such a way as to face the stator assembly. A predetermined gap is defined between the magnet 7 and the stator assembly.

The operation of the conventional motor with the sintered oil retaining bearing which is constructed in this way is as follows. First, when an electric current is applied to the coil 8 wound around the core 8a through the base panel 9 that is mounted to the outer surface of the bearing holder 10, electromagnetic force is generated between the core 8a, the coil 8, and the magnet 7 that is attached to the rotor casing 6. By the electromagnetic force, the magnet 7, the rotor casing 6, the shaft holder 3, and the polygon mirror 5 are simultaneously rotated around the motor shaft 2.

In this case, the sintered oil retaining bearing 1, provided at the outer surface of the motor shaft 2, allows the motor shaft 2 to be smoothly rotated while supporting the motor shaft 2.

The conventional motor with the sintered oil retaining bearing 1 is advantageous in that it is easy to manufacture, its manufacturing cost is low, and it has high durability.

However, the conventional motor with the sintered oil retaining bearing 1 has a problem that vibration may occur due to a gap between the motor shaft 2 and the bearing 1, so a speed variation is high and its life span becomes short.

Thus, in order to solve the problem, there have been proposed several methods to prevent the vibration. That is, a small gap of about 1~3 μm may be defined between the sintered oil retaining bearing 1 and the motor shaft 2. Further, the sintered oil retaining bearing 1 may have an increased axial length.

However, such methods have a problem that periodic vibration is reduced but aperiodic vibration still remains. Further, when the gap between the sintered oil retaining bearing 1 and the motor shaft 2 is small, power consumption is undesirably increased and machining precision is degraded.

Meanwhile, FIG. 2 shows another conventional motor in which a fluid dynamic bearing is installed. As shown in FIG. 2, the conventional motor includes a cylindrical sleeve 20 which has a hollow part. A motor shaft 12 is inserted into the hollow part. A base panel 19 is mounted to an outer surface of the sleeve 20. A stator assembly 18 is mounted to the outer surface of an upper portion of the sleeve 20, and is provided with a core around which a coil is wound.

Further, '<'-shaped grooves 11 for generating dynamic pressure are formed on upper and lower portions of an outer surface of the motor shaft 12 which is inserted into the sleeve 20, through a cutting process.

In FIG. 2, the grooves 11 are formed on the outer surface of the motor shaft 12. However, the grooves 11 may be formed on an inner surface of the sleeve 20.

A shaft holder 13 is fitted over an upper portion of the motor shaft 12, and a polygon mirror 15 is firmly seated on an upper portion of the shaft holder 13. Further, a rotor casing 16 is mounted to a lower portion of the shaft holder 13. A magnet 17 is attached to an inner surface of the rotor casing 16 in such a way as to face the stator assembly 18. In this case, a predetermined gap is defined between the magnet 17 and the stator assembly 18.

In such a conventional fluid dynamic bearing motor, the magnet 17, the rotor casing 16, the shaft holder 13, and the polygon mirror 15 are simultaneously rotated around the motor shaft 12 by electromagnetic force which is generated between the core and the coil constituting the stator assembly 18, and the magnet 17 attached to the rotor casing 16. At this time, a laser beam is irradiated and reflected by the rotating polygon mirror 15.

In the conventional fluid dynamic bearing motor, oil (not shown) is spread over the grooves 11. Thus, as the motor shaft 12 is rotated, oil is concentrated into the grooves 11, thus generating oil pressure. The oil pressure allows the motor shaft 12 to be smoothly rotated without being in contact with the sleeve 20.

The conventional motor having the fluid dynamic bearing is advantageous in that it prevents vibration. However, the conventional motor having the fluid dynamic bearing is problematic in that the grooves 11 must be formed on the outer surface of the motor shaft 12 or the inner surface of the sleeve 20, so it is complicated to manufacture, and its manufacturing cost is higher in comparison with the motor having the sintered oil retaining bearing.

Further, the conventional motor having the fluid dynamic bearing has another problem that oil must be always supplied to the motors so as to generate dynamic pressure, so it is difficult to supply oil to the motor and oil may leak out.

Furthermore, when oil is short, expected dynamic pressure is not achieved. In this case, the motor shaft 12 frequently comes into frictional contact with the sleeve 20, so the motor's life span is reduced. Due to frictional contact between the motor shaft 12 and the sleeve 20, the motor shaft 12 may be thermally fused to the sleeve 20, so the motor may be undesirably stopped.

SUMMARY OF THE INVENTION

Accordingly, the present invention has been made keeping in mind the above problems occurring in the prior art, and an object of the present invention is to provide a kinetic pressure bearing motor which is provided with an auxiliary dynamic generating means, thus allowing a motor shaft to be stably rotated at a high speed and considerably reducing vibration, therefore enhancing performance of the motor and lengthening the life-span of the motor.

Another object of the present invention is to provide a kinetic pressure bearing motor that is easy to manufacture and is low in manufacturing cost.

In order to accomplish the above object, the present invention provides a kinetic pressure bearing motor, including a motor shaft, a support unit for supporting the motor shaft, a shaft holder mounted to an end of the motor shaft, and an auxiliary dynamic pressure generating means provided at both the support unit and the shaft holder.

The auxiliary dynamic pressure generating means includes a groove formed on an outer surface of the support unit to generate dynamic pressure, and an extension provided at the shaft holder to support the outer surface of the support unit having the groove while being in contact with the outer surface of the support unit.

The support unit comprises a bearing holder which is provided at an outer surface of a first bearing to surround the first bearing functioning to support the motor shaft, and the first bearing comprises a sintered oil retaining bearing.

The support unit comprises a sleeve, or a sintered oil retaining bearing which supports the motor shaft.

In order to accomplish the above object, the present invention provides a kinetic pressure bearing motor, including a motor shaft, a first bearing for supporting the motor shaft, a bearing holder having a hollow part in which the motor shaft and the first bearing are inserted, with a groove being formed on an outer surface of the bearing holder to generate dynamic pressure, a base plate mounted to the outer surface of the bearing holder in such a way as to be supported at the outer surface of the bearing holder, a stator assembly mounted to the outer surface of the bearing holder, a shaft holder fitted over the motor shaft and provided with an extension which is arranged in such a way as to be in contact with the outer surface of the bearing holder having the groove to support the bearing holder, a polygon mirror seated on an upper portion of the shaft holder, a rotor casing mounted to a lower portion of the shaft holder, and a magnet attached to an inner surface of the rotor casing in such a way as to face the stator assembly, with a predetermined gap defined between the magnet and the stator assembly.

The first bearing comprises a sintered oil retaining bearing.

In order to accomplish the above object, the present invention provides a kinetic pressure bearing motor, including a motor shaft, a cylindrical sleeve having a hollow part in which the motor shaft is inserted, with a groove being formed on an outer surface of the sleeve to generate dynamic pressure, a base plate mounted to the outer surface of the sleeve, a stator assembly mounted to the outer surface of the sleeve, a shaft holder fitted over the motor shaft and provided with an extension which is in contact with the outer surface of the sleeve having the groove to support the sleeve, a polygon mirror seated on an upper portion of the shaft holder, a rotor casing mounted to a lower portion of the shaft holder, and a magnet attached to an inner surface of the rotor casing in such a way as to face the stator assembly, with a predetermined gap defined between the magnet and the stator assembly.

In order to accomplish the above object, the present invention provides a kinetic pressure bearing motor, including a stator unit having a motor shaft, a housing to which the motor shaft is fixed, and a stator assembly, a rotor unit having a sleeve fitted over the motor shaft, a hub mounted to an outer surface of the sleeve, and a magnet mounted to an inner surface of the hub in such a way as to be spaced apart from the stator assembly by a predetermined gap, and an auxiliary dynamic pressure generating means provided at both the stator unit and the rotor unit.

The auxiliary dynamic pressure generating means comprises a dynamic pressure generating groove which is formed on an outer surface of the hub, a part of the hub being received in the housing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
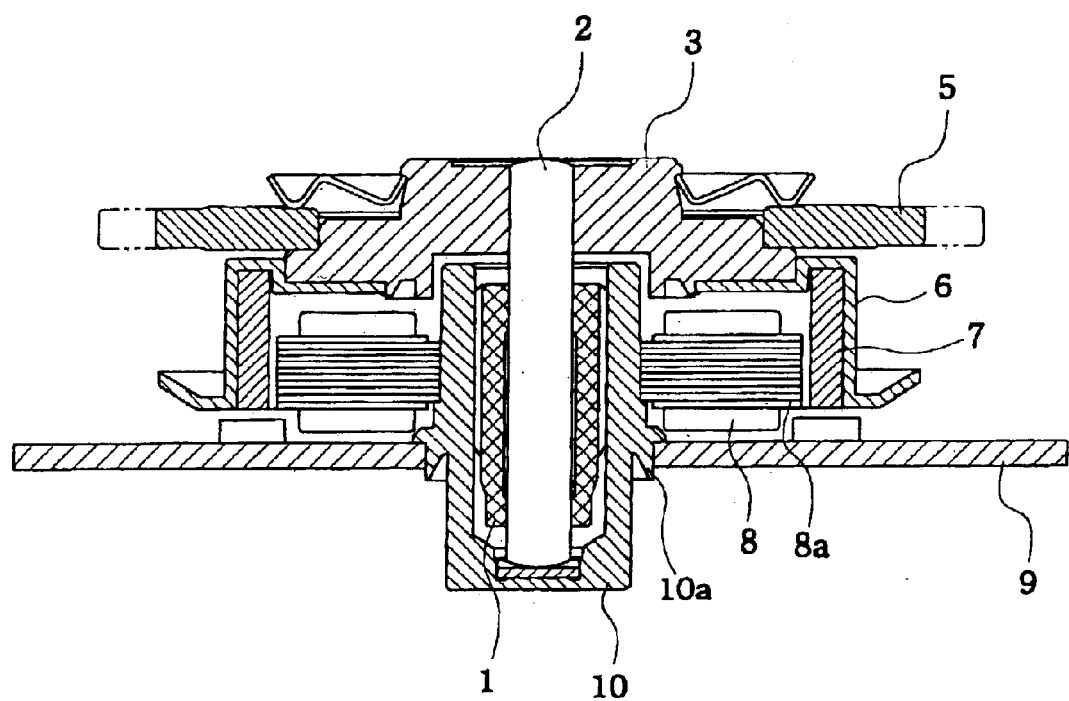
FIG. 1 is a sectional view showing a conventional motor in which a sintered oil retaining bearing is installed.
Figure 2:
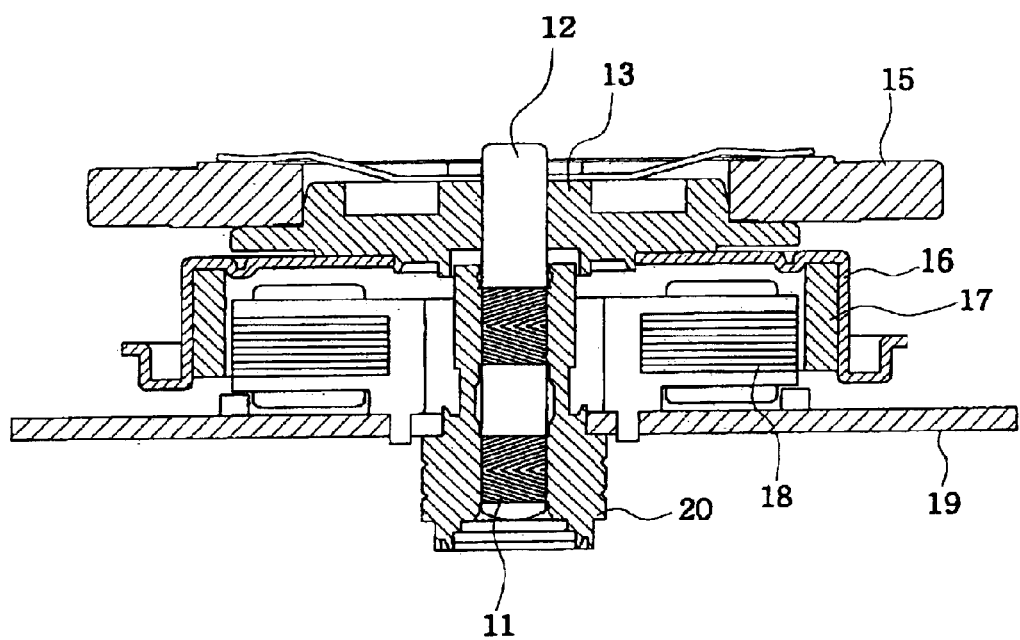
FIG. 2 is a sectional view showing another conventional motor in which a fluid dynamic bearing is installed.

Reference should now be made to the drawings, in which the same reference numerals are used throughout the different drawings to designate the same or similar components.

A kinetic pressure bearing motor according to the present invention will be described in the following in detail with reference to several embodiments.

Figure 3:
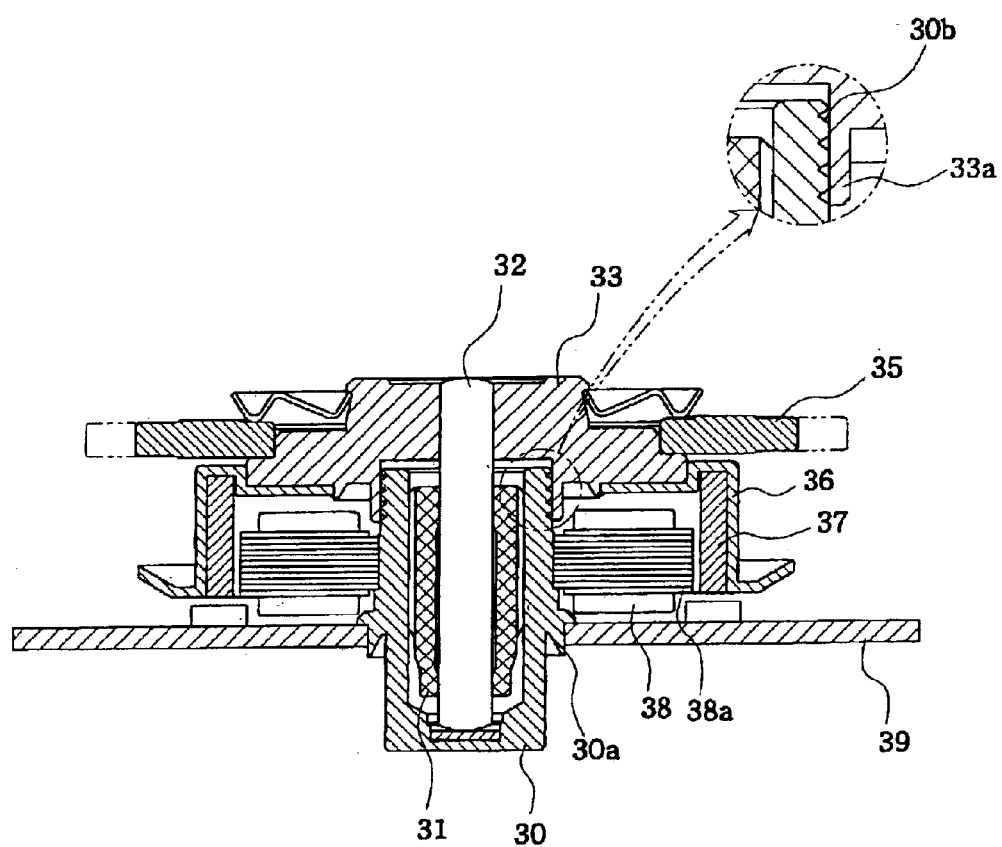
FIG. 3 is a sectional view showing a kinetic pressure bearing motor according to a primary embodiment of the present invention.

FIG. 3 is a sectional view showing a kinetic pressure bearing motor according to a primary embodiment of the present invention. The kinetic pressure bearing motor includes a cylindrical bearing holder 30. The cylindrical bearing holder 30 has a hollow part in which a motor shaft 32 is inserted. An annular boss 30a is provided at an outer surface of the bearing holder 30 to support a base plate 39.

Further, a stator core 38a around which a coil 38 is wound is mounted to the outer surface of the bearing holder 30.

The motor shaft 32 is inserted into the hollow part of the bearing holder 30, and is supported by a sintered oil retaining bearing 31 in horizontal and vertical directions. The sintered oil retaining bearing 31 is provided in the bearing holder 30 to surround the motor shaft 32.

A shaft holder 33 is fitted over an upper portion of the motor shaft 32. A polygon mirror 35 is firmly seated on an upper portion of the shaft holder 33.

A rotor casing 36 is mounted to a lower portion of the shaft holder 33. A magnet 37 is attached to an inner surface of the rotor casing 36 in such a way as to face the stator core 38a around which the coil 38 is wound. In this case, a predetermined gap is defined between the magnet 37 and the stator core 38a.

The kinetic pressure bearing motor of the primary embodiment has the same construction as a conventional sintered oil retaining bearing motor, except that the kinetic pressure bearing motor is further provided with an auxiliary dynamic pressure generating means.

That is, according to the present invention, the kinetic pressure bearing motor is provided with the auxiliary dynamic pressure generating means for generating dynamic pressure when the motor shaft 32 is rotated, thus allowing the motor shaft 32 to be stably rotated at a high speed.

The auxiliary dynamic pressure generating means has a construction for generating dynamic pressure between a rotor unit which is rotated around the motor shaft 32 and a stator unit which supports the rotating motor shaft 32. In this case, the rotor unit includes the shaft holder 33, the polygon mirror 35, the magnet 37, and the rotor casing 36. The stator unit includes the sintered oil retaining bearing 31, the bearing holder 30, the base plate 39, and the stator core 38a.

Figure 4:
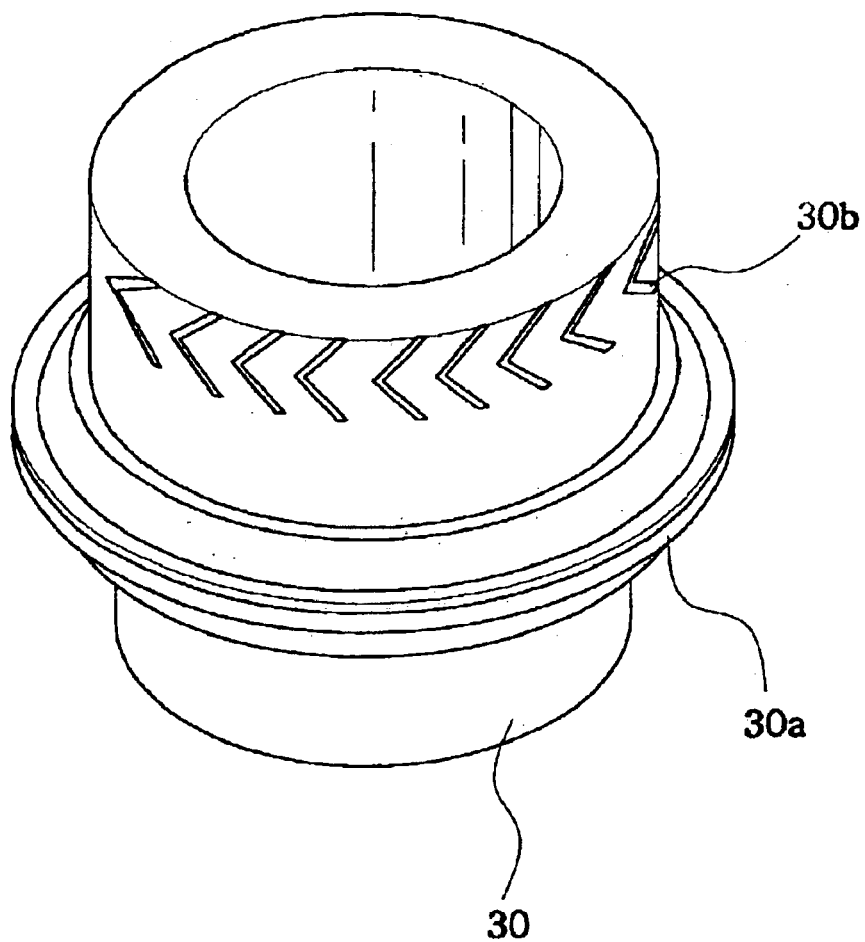
FIG. 4 is a perspective view of a bearing holder included in the kinetic pressure bearing motor shown in FIG. 3.

In the kinetic pressure bearing motor according to the primary embodiment of the present invention, the construction of the auxiliary dynamic pressure generating means is as follows. That is, as shown in FIG. 4, a plurality of dynamic pressure generating grooves 30b are formed on the outer surface of the bearing holder 30, and an extension 33a is provided at the shaft holder 33 to support the bearing holder 30 while being in contact with the outer surface of the bearing holder 30 having the dynamic pressure generating grooves 30b.

The extension 33a has a cylindrical shape which downwardly extends from the shaft holder 33, and maintains a fine gap with the grooves 30b so that the extension 33a is not in contact with the grooves 30b.

That is, the grooves 30b are formed on the outer surface of the bearing holder 30, and the extension 33a is provided at the shaft holder 33 to surround the grooves 30b while being spaced apart from the grooves 30b by a predetermined gap, thus allowing pneumatic dynamic pressure to be generated by the grooves 30b and the extension 33a when the motor is rotated.

The operation of the motor according to the present invention which is constructed in this way is as follows. First, when an electric current is applied to the coil 38 wound around the stator core 38a, through the base plate 39 which is mounted to the outer surface of the bearing holder 30, electromagnetic force is generated between the stator core 38a, the coil 38, and the magnet 37 attached to the rotor casing 36. By the electromagnetic force, the magnet 37, the rotor casing 36, the shaft holder 33, and the polygon mirror 35 are simultaneously rotated around the motor shaft 32. At this time, the sintered oil retaining bearing 31, mounted to an outer surface of the motor shaft 32, allows the motor shaft 32 to be smoothly rotated while supporting the motor shaft 32.

Further, according to the primary embodiment of the present invention, the grooves 30b are formed on the outer surface of the bearing holder 30, so airflow is concentrated to the grooves 30b when the motor shaft 32 is rotated, thus generating pneumatic dynamic pressure. The pneumatic dynamic pressure allows the shaft holder 33 to be smoothly rotated without being in contact with the bearing holder 30.

As such, the kinetic pressure bearing motor of the present invention is designed such that the grooves 30b are formed on the outer surface of the upper portion of the bearing holder 30 and the shaft holder 33 is arranged to surround the outer surface of the bearing holder 30 having the grooves 30b, while having an almost identical construction to the conventional sintered oil retaining bearing motor. In this case, dynamic pressure is generated by the bearing holder 30 and the shaft holder 33 which are constructed as described above, thus preventing vibration without incurring a considerable cost and thereby enhancing performance of the motor and lengthening a life span of the motor.

In the primary embodiment of the present invention, the auxiliary dynamic pressure generating means is applied to a general sintered oil retaining bearing motor which is provided with the sintered oil retaining bearing 31. However, the auxiliary dynamic pressure generating means of the present invention may be applied to a motor which is provided with a bearing other than the sintered oil retaining bearing motor, by designing the motor such that grooves are formed on a bearing holder and an extension is provided at a shaft holder to support the outer surface of the bearing holder having the grooves.

Further, in the primary embodiment of the present invention, the grooves 30b are formed on the outer surface of the bearing holder 30 and the extension 33a of the shaft holder 33 surrounds the grooves 30b. However, the grooves may be formed on an inner surface of the extension 33a of the shaft holder 33, instead of forming the grooves on the outer surface of the bearing holder 30. Even when the grooves are formed on the inner surface of the extension 33a, the same effect is accomplished.

Figure 5:
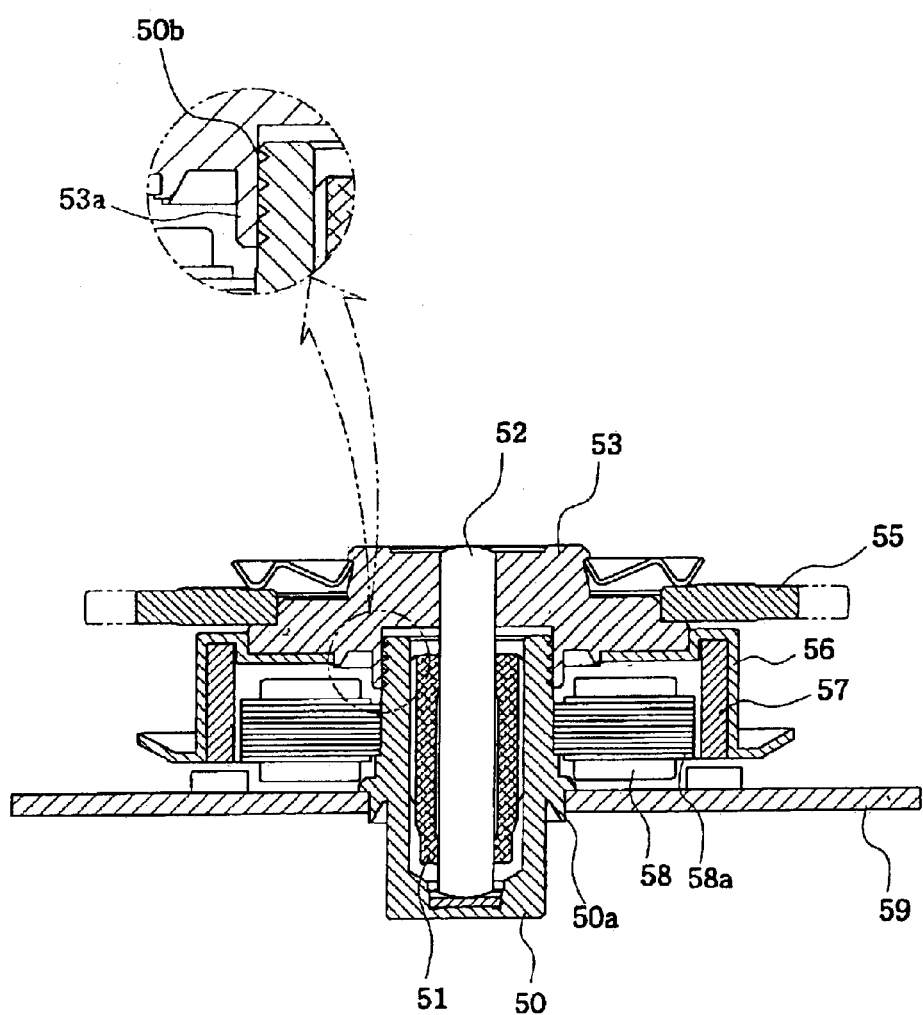
FIG. 5 is a sectional view showing a kinetic pressure bearing motor according to a second embodiment of the present invention.

FIG. 5 shows a kinetic pressure bearing motor according to a second embodiment of the present invention, in which the auxiliary dynamic pressure generating means is applied to a motor that is provided with a bearing other than the sintered oil retaining bearing. The dynamic bearing motor includes a cylindrical bearing holder 50, a base plate 59, a stator core 58a, a shaft holder 53, and a polygon mirror 55. The cylindrical bearing holder 50 has a hollow part in which a motor shaft 52 is inserted. An annular boss 50a is provided on an outer surface of the bearing holder 50 to support the base plate 59. The stator core 58a is mounted to the outer surface of the bearing holder 50. A coil 58 is wound around the stator core 58a. The shaft holder 53 is fitted over an upper portion of the motor shaft 52. The polygon mirror 55 is firmly seated on an upper portion of the shaft holder 53.

Further, a rotor casing 56 is mounted to a lower portion of the shaft holder 53. A magnet 57 is attached to an inner surface of the rotor casing 56 in such a way as to face the stator core 58a around which the coil 58 is wound. In this case, a predetermined gap is defined between the magnet 57 and the stator core 58a.

A bearing 51 is provided in the hollow part of the bearing holder 50 to support the motor shaft 52. A plurality of grooves 50b for generating dynamic pressure are formed on the outer surface of the bearing holder 50. An extension 53a is provided at the shaft holder 53 in such a way as to be in contact with the outer surface of the bearing holder 50 on which the grooves 50b are formed.

In this case, the bearing 51 is not a sintered oil retaining bearing, but a general type bearing. As such, according to the second embodiment of the present invention, it is possible to apply the auxiliary dynamic pressure generating means to the motor having a bearing other than the sintered oil retaining bearing, thus providing a variety of kinds of motors which are easy to manufacture, low in manufacturing cost, and allow the motor shaft to be stably rotated at a high speed.

Figure 6:
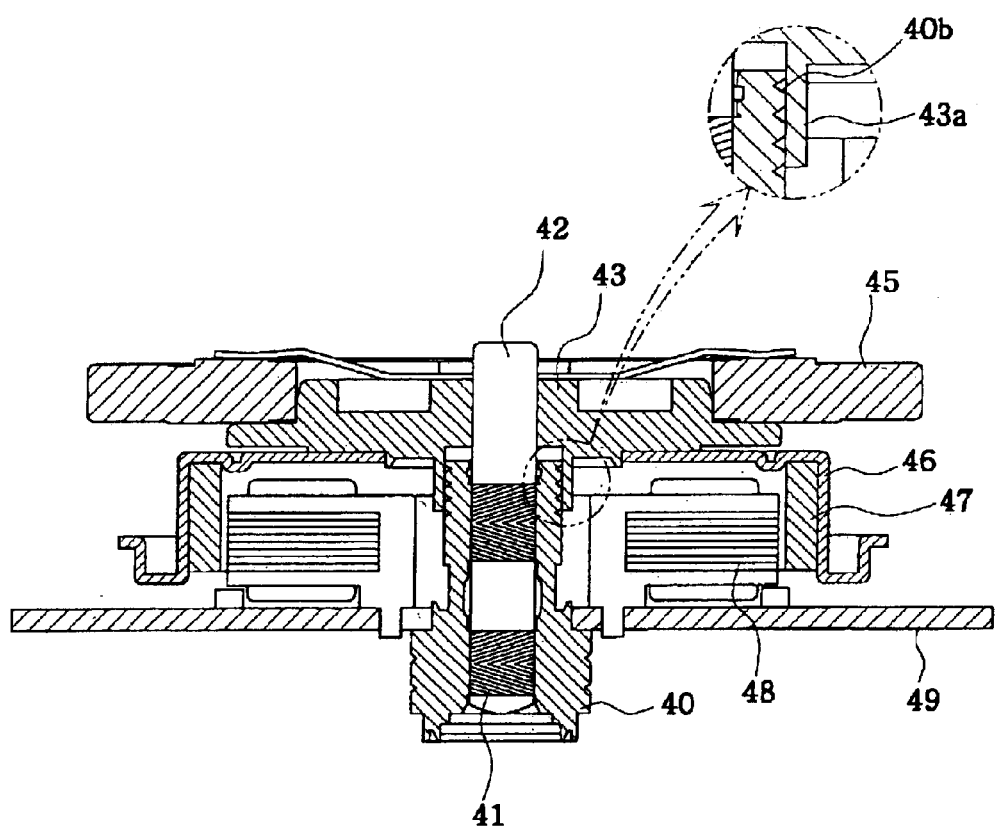
FIG. 6 is a sectional view of a kinetic pressure bearing motor according to a third embodiment of the present invention.

FIG. 6 shows a kinetic pressure bearing motor according to a third embodiment of the present invention. The kinetic pressure bearing motor includes a cylindrical sleeve 40. The sleeve 40 has a hollow part in which a motor shaft 42 is inserted. A base plate 49 is mounted to an outer surface of the sleeve 40. A stator assembly 48 is mounted to an outer surface of an upper portion of the sleeve 40, and comprises a core around which a coil is wound.

Further, '<'-shaped first grooves 41 for generating dynamic pressure are formed on outer surfaces of upper and lower portions of the motor shaft 42 which is inserted into the sleeve 40, through a cutting process.

A shaft holder 43 is fitted over the upper portion of the motor shaft 42. A polygon mirror 45 is firmly seated on an upper portion of the shaft holder 43. A rotor casing 46 is mounted to a lower portion of the shaft holder 43. A magnet 47 is attached to an inner surface of the rotor casing 46 in such a way as to face the stator assembly 48. A predetermined gap is defined between the magnet 47 and the stator assembly 48.

The kinetic pressure bearing motor of the third embodiment has the same construction as a conventional fluid dynamic bearing motor, except that the kinetic pressure bearing motor of the third embodiment is further provided with an auxiliary dynamic pressure generating means.

The auxiliary dynamic pressure generating means has a construction for generating dynamic pressure between a rotor unit which is rotated around the motor shaft 42 and a stator unit which supports the rotating motor shaft 42. In this case, the rotor unit includes the shaft holder 43, the polygon mirror 45, the magnet 47, and the rotor casing 46. The stator unit includes the sleeve 40, the base plate 49, and the stator assembly 48.

Figure 7:
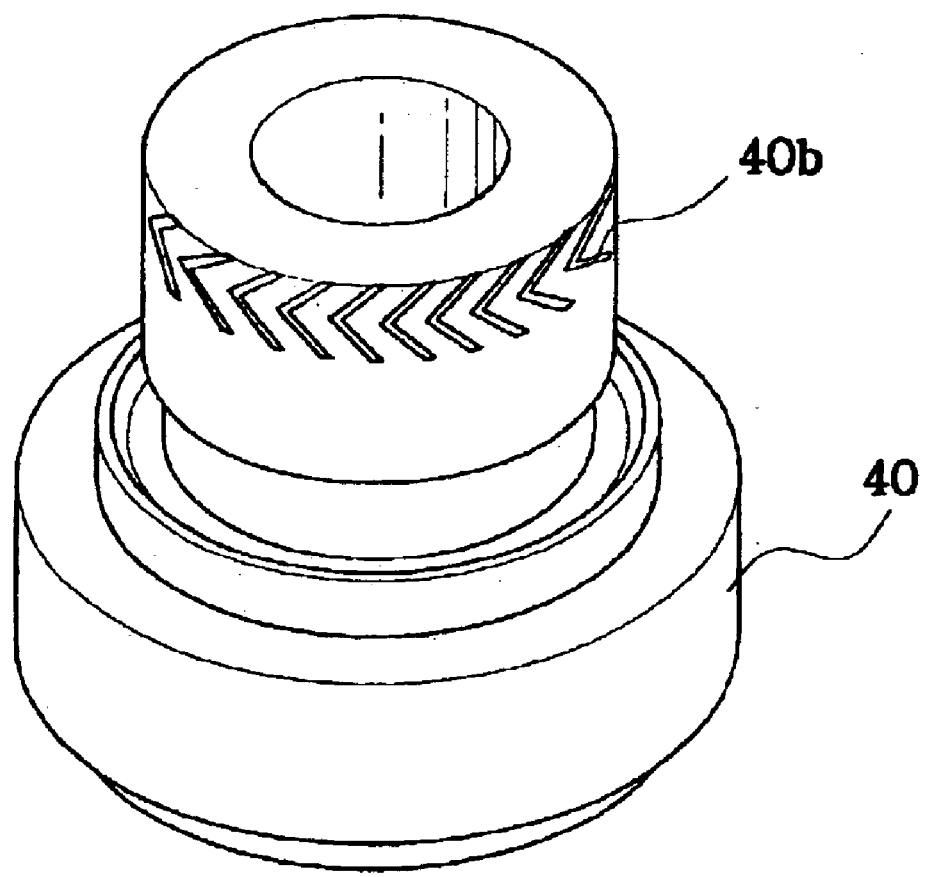
FIG. 7 is a perspective view of a sleeve included in the kinetic pressure bearing motor shown in FIG. 6.

In the kinetic pressure bearing motor according to the third embodiment of the present invention, the construction of the auxiliary dynamic pressure generating means is as follows. That is, as shown in FIG. 7, a plurality of second grooves 40b for generating dynamic pressure are formed on an outer surface of the sleeve 40, and an extension 43a is provided at the shaft holder 43 to support the sleeve 40 while being in contact with the outer surface of the sleeve 40 having the second grooves 40b.

The extension 43a has a cylindrical shape which downwardly extends from the shaft holder 43, and maintains a fine gap with the grooves 40b so that the extension 43a is not in contact with the grooves 40b.

That is, the second grooves 40b are formed on the outer surface of the sleeve 40, and the extension 43a is provided at the shaft holder 43 to surround the second grooves 40b while being spaced apart from the second grooves 40b by a predetermined gap, thus allowing pneumatic dynamic pressure from being generated by the second grooves 40b and the extension 43a when the motor is rotated.

In the kinetic pressure bearing motor according to the third embodiment of the present invention, electromagnetic force is generated between the core and the coil constituting the stator assembly 48 and the magnet 47 attached to the rotor casing 46. By the electromagnetic force, the magnet 47, the rotor casing 46, the shaft holder 43, and the polygon mirror 45 are simultaneously rotated around the motor shaft 42. At this time, a laser beam is irradiated and reflected by the rotating polygon mirror 45.

In the fluid dynamic bearing motor which is constructed in this way, oil (not shown) is spread over the first grooves 41 which are formed on the motor shaft 42. Thus, as the motor shaft 42 is rotated, oil is concentrated into the first grooves 41, thus generating oil pressure. The oil pressure allows the motor shaft 42 to be smoothly rotated without being in contact with the sleeve 40.

Further, according to the third embodiment of the present invention, the second grooves 40b, serving as the auxiliary dynamic pressure generating means, are formed on the sleeve 40, and the extension 43a is provided at the shaft holder 43 in such a way as to be in contact with the second grooves 40b. Thus, as the motor shaft 42 is rotated, airflow is concentrated to the second grooves 40b, thus generating pneumatic dynamic pressure. The pneumatic dynamic pressure allows the shaft holder 43 to be smoothly rotated without being in contact with the sleeve 40.

As such, the fluid dynamic bearing motor of the present invention is designed such that the second grooves 40b are formed on the outer surface of the upper portion of the sleeve 40 and the shaft holder 43 is arranged to surround the outer surface of the sleeve 40 having the second grooves 40b, while having an almost identical construction to the conventional fluid dynamic bearing motor. In the fluid dynamic bearing motor of the present invention which is constructed in this way, the sleeve 40 having the second grooves 40b cooperates with the shaft holder 43 to generate dynamic pressure, thus preventing vibration without incurring a considerable cost and thereby enhancing performance of the motor and lengthening the life span of the motor.

Meanwhile, fluid dynamic bearing motors are classified into two types, that is, a shaft-rotatable type motor and a shaft-fixed type motor, depending on whether a motor shaft is rotatable or not. It is possible to apply the present invention to the shaft-fixed type motor as well as the shaft-rotatable type motor.

Figure 8:
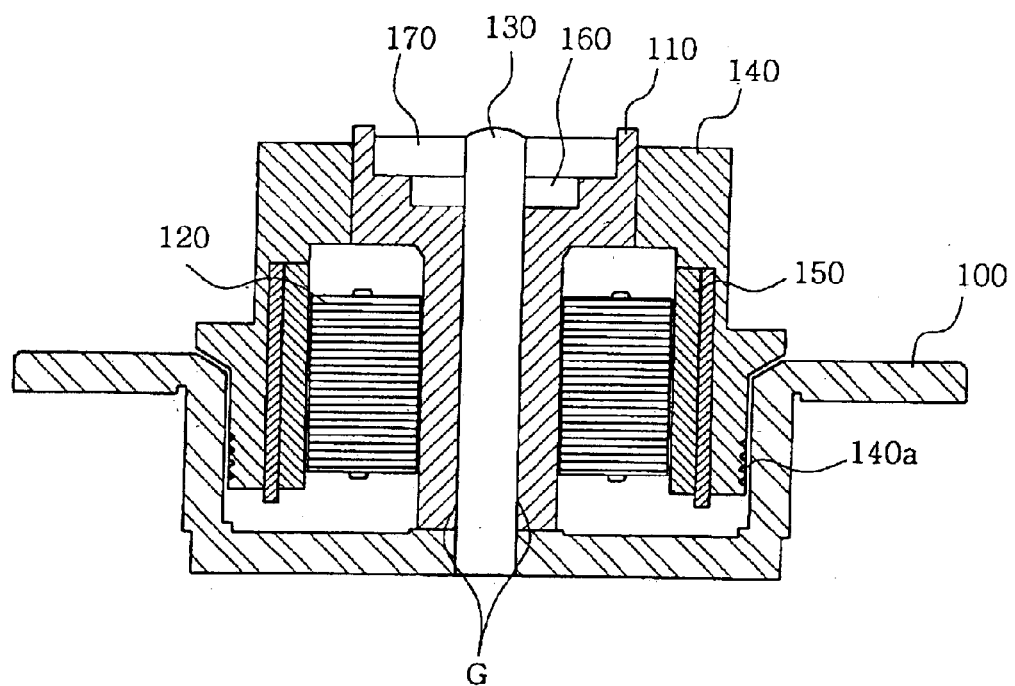
FIG. 8 is a sectional view showing a kinetic pressure bearing motor according to a fourth embodiment of the present invention.

FIG. 8 is a sectional view showing a fluid dynamic bearing motor according to a fourth embodiment of the present invention, in which an auxiliary dynamic pressure generating means is applied to a general shaft-fixed type motor. The fluid dynamic bearing motor includes a stator unit and the rotor unit. The stator unit includes a housing 100, a core 120, and a shaft 130. The rotor unit includes a sleeve 110, a hub 140, and a magnet 150.

Such a shaft-fixed type fluid dynamic bearing motor is designed such that the sleeve 110 and the hub 140 are integrally rotated around the shaft 130 which is fixed to the housing 100. An oil gap G is defined between an inner circumference of the sleeve 110 and the shaft 130 to contain oil having a predetermined viscosity therein.

The sleeve 110 is rotatably fitted over the shaft 130 with a disc-shaped thrust bearing 160 interposed between an upper portion of the shaft 130 and the sleeve 110. The shaft 130 is fixed, at its lower end, to a center of the housing 100.

The housing 100 is upwardly projected by a predetermined height at a portion around a hole in which the shaft 130 is inserted. A core 120 around which a coil is wound is installed on the surface of the projected portion inside the housing 100.

In this case, first grooves (not shown) for generating dynamic pressure are formed on top and bottom surfaces of the thrust bearing 160, like the above-mentioned shaft-rotatable type motor, thus generating fluid dynamic pressure in an axial direction.

A top end of the sleeve 110 is covered with a cover plate 170. The thrust bearing 160 is in rotatable contact with the bottom of the cover plate 170.

Further, the hub 140 is mounted to an outer surface of an upper portion of the sleeve 110 in such a way as to be rotated along with the sleeve 110. A magnet 150 is attached to an inner surface of the hub 140 in such a way as to face the core 120.

Further, an oil gap G is defined between an inner circumference of the sleeve 110, the shaft 130, and the thrust bearing 160 to contain oil therein.

A plurality of second grooves 140a for generating dynamic pressure are formed on an outer surface of a lower portion of the hub 140, so that a fine gap is defined between the housing 100 and the hub 140. Thus, when the motor is rotated, pneumatic dynamic pressure is generated by the grooves 140a and the housing 100.

The operation of the shaft-fixed type fluid dynamic bearing motor which is constructed in this way is as follows. When an electric current is applied to the core 120, electromagnetic force of a predetermined magnitude is generated between the core 120 and the magnet 150, so the hub 140 to which the magnet 150 is attached is rotated. At this time, the sleeve 110 mounted to the hub 140 is also rotated around the shaft 130 that is integrated with the housing 100.

In this case, fluid dynamic pressure is generated by the oil gap G that is defined between the inner circumference of the sleeve 110, the shaft 130 and the thrust bearing 160, so the sleeve 110 is rotated while it is not in contact with the shaft 130.

Further, the second grooves 140a for generating dynamic pressure are formed on the outer surface of the lower portion of the hub 140 in such a way as to be in contact with the inner surface of the housing 100, so dynamic pressure is generated by the second grooves 140a, thus allowing the hub 140 to be more stably rotated.

As described above, the present invention provides a kinetic pressure bearing motor which is provided with an auxiliary dynamic pressure generating means, thus allowing a motor shaft to be stably rotated at a high speed, and considerably reducing vibration, therefore enhancing the performance and lengthening the life span of the motor.

Further, the present invention provides a kinetic pressure bearing motor that is easy to manufacture and is low in manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A kinetic pressure bearing motor, comprising:

a motor shaft;

a support unit for supporting the motor shaft and including a first bearing having a sleeve accepting said motor shaft and a cylindrical bearing holder disposed around said sleeve;

a shaft holder mounted to an end of the motor shaft; and auxiliary dynamic pressure generating means provided between the support unit and the shaft holder and forming a kinetic pressure bearing.

2. The kinetic pressure bearing motor according to claim 1, wherein said auxiliary dynamic pressure generating means comprises:

a groove formed on an outer surface of the support unit to generate dynamic pressure; and an extension provided at the shaft holder to support the outer surface of the support unit.

3. The kinetic pressure bearing motor according to claim 2 wherein said groove is formed on an outer surface of said cylindrical bearing holder.

4. The kinetic pressure bearing motor according to claim 1, wherein said first bearing comprises a sintered oil retaining bearing.

5. The kinetic pressure bearing motor according to claim 1, wherein said auxiliary dynamic pressure generating means comprises:

a groove formed on one of said support unit and said shaft holder to generate dynamic pressure.

6. The kinetic pressure bearing motor according to claim 1, wherein said shaft holder has an extension coaxial with said cylindrical bearing holder and said auxiliary pressure generating means is provided between said extension and said cylindrical bearing holder.

7. A kinetic pressure bearing motor, comprising:

a motor shaft;

a first bearing for supporting the motor shaft, said first bearing having a sleeve accepting said motor shaft;

a bearing holder having a hollow part in which the motor shaft and the first bearing are inserted, with a groove being formed on an outer surface of the bearing holder to generate dynamic pressure;

a base plate mounted to the outer surface of the bearing holder in such a way as to be supported at the outer surface of the bearing holder;

a stator assembly mounted to the outer surface of the bearing holder;

a shaft holder fitted over the motor shaft and provided with an extension, said extension being disposed around the outer surface of the bearing holder having the groove, and forming a kinetic pressure bearing to support the bearing holder;

a polygon mirror seated on an upper portion of the shaft holder;

a rotor casing mounted to a lower portion of the shaft holder; and a magnet attached to an inner surface of the rotor casing in such a way as to face the stator assembly, with a predetermined gap defined between the magnet and the stator assembly.

8. The kinetic pressure bearing motor according to claim 7, wherein said first bearing comprises a sintered oil retaining bearing.

9. A kinetic pressure bearing motor, comprising:

a motor shaft;

a first bearing with a sleeve accepting said motor shaft;

a cylindrical bearing holder having a hollow part in which the motor shaft and the first bearing are inserted, with a groove being formed on an outer surface of the cylindrical bearing holder to generate dynamic pressure;

a base plate mounted to the outer surface of the cylindirical bearing holder;

a stator assembly mounted to the outer surface of the cylindrical bearing holder;

a shaft holder fitted over the motor shaft and provided with an extension, said extension being disposed around the outer surface of the cylindrical bearing holder having the groove, thus defining a kinetic pressure bearing supporting the sleeve;

a polygon mirror seated on an upper portion of the shaft holder;

a rotor casing mounted to a lower portion of the shaft holder; and a magnet attached to an inner surface of the rotor casing in such a way as to face the stator assembly, with a predetermined gap defined between the magnet and the stator assembly.

* * * * *